United States Patent [19]
Howe

[11] 4,419,750
[45] Dec. 6, 1983

[54] CONSTANT TRACK WIDTH OPTICAL DISK RECORDING

[75] Inventor: Dennis G. Howe, Pittsford, N.Y.
[73] Assignee: Eastman Kodak Company, Rochester, N.Y.
[21] Appl. No.: 282,617
[22] Filed: Jul. 13, 1981
[51] Int. Cl.³ .............................................. G11B 7/00
[52] U.S. Cl. .................................. 369/111; 358/342; 346/76 L; 369/116
[58] Field of Search ............. 358/342, 347; 346/76 L; 369/111, 116, 124, 125, 275, 284

[56] References Cited

U.S. PATENT DOCUMENTS

| | | | |
|---|---|---|---|
| 3,894,179 | 7/1975 | Jacobs | 369/111 |
| 3,902,010 | 8/1975 | Goshima | 369/111 |
| 4,051,329 | 9/1977 | Blondet | 369/116 |
| 4,118,734 | 10/1978 | Bouwhuis et al. | 358/128 |
| 4,142,210 | 2/1979 | Otobe et al. | 358/128 |
| 4,157,568 | 6/1979 | Ohki et al. | 358/128 |
| 4,283,785 | 8/1981 | Miyauchi | 369/106 |
| 4,328,506 | 5/1982 | Yoshida | 346/76 L |

OTHER PUBLICATIONS

"Intermodulation and Moire Effects In Optical Video Recording" by M. R. DeHaan et al., Philips Res. Repts., vol. 32, pp. 436-459 (1977).

*Primary Examiner*—Alan Faber
*Attorney, Agent, or Firm*—John D. Husser

[57] ABSTRACT

In accordance with the present invention, methods and apparatus are provided for making optical disk recordings having marks in radial format, representing information signals, of total fractional bandwidths greater than about 3 wherein information is recorded along constant width tracks irrespective of the radial position of recording. Specifically, constant track width recording is achieved by controlling the various recording parameters (recording spot size, tangential velocity of the optical disk, and the modulation of the recording spot) such that the optical disk receives approximately the same maximum energy density during recording of all information marks.

22 Claims, 11 Drawing Figures

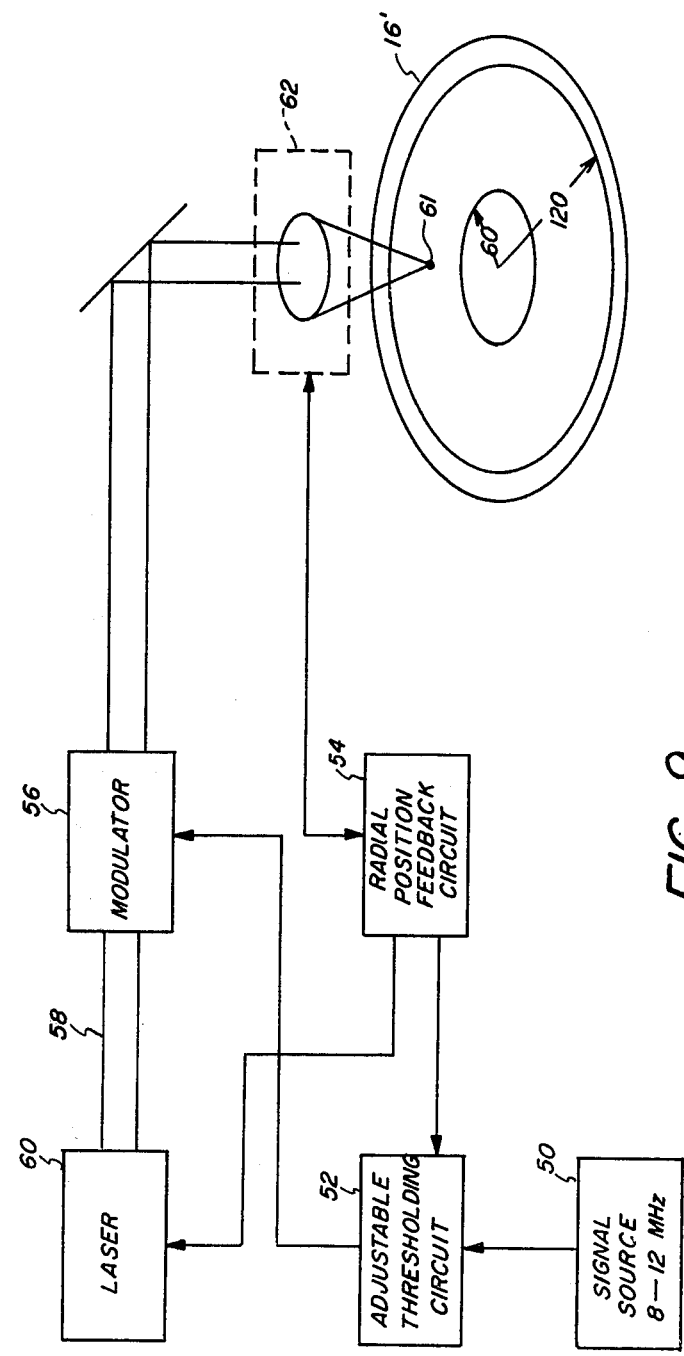

CONSTANT TRACK WIDTH OPTICAL DISK RECORDING

BACKGROUND OF THE INVENTION

1. Field of the Invention

The present invention relates to optical disks and, more particularly, to methods and apparatus for recording information thereon.

2. Description Relative to the Prior Art

An optical disk is a record device comprised of a layer (or layers) of recording material coated on a disk-shaped substrate. During the recording process, the optical disk is spun and a recording spot formed by focusing a laser beam on the optical disk surface is modulated in accordance with information to be recorded while being scanned radially across the spinning optical disk. As a result, information is recorded on the disk along a spiral track extending between outer and inner disk radii. Alternatively, it is known to scan the recording spot across the optical disk in such a manner as to cause information to be recorded along concentric circular tracks. The term radial format recording is used hereinafter to refer to such recording formats, as well as to variations thereof.

It is often convenient to record the same amount of information (e.g., one television frame or field) or the same bandwidth of information per revolution of the disk, irrespective of the radial position on the disk. As a result, the in-track spatial frequency (i.e., reciprocal length) of recorded information marks increases with decreasing radial position because the record track length corresponding to a revolution of the disk is proportional to its radial position. As an illustrative example, assume that information is recorded on an optical disk at an outer radial position of 100 mm and an inner radial position of 50 mm. If the information recorded at the outer radial position is in the form of marks which are 1.2 microns in length and which are spaced apart by 0.8 microns, then this same information should be recorded at the inner radial position in the form of marks which are 0.6 microns in length and which are spaced apart by 0.4 microns. As will be seen from the discussion which follows, this radial dependence of the in-track spatial frequency of recorded information leads to problems upon playback.

In the playback process, a playback spot is formed on the optical disk surface and is made to follow the track of recorded information. The interaction between the playback spot and the recorded information causes the playback spot to be "modulated" (as described in detail below) in accordance with the recorded information. By directing the "modulated" playback spot onto a detector, an electrical signal is produced which is representative of the recorded information. Ideally, the information content of the electrical signal produced upon playback should be the same as the originally recorded signal.

In actual practice, the scaling of the spatial frequency of recorded information marks as a function of disk radius leads to distortion upon playback because of the modulation transfer function of the playback optical system. Generally, such an optical system is diffraction limited and, as is well known, the modulation transfer function decreases as the spatial frequencies being imaged increase. As a result, the signal produced by playing back information recorded at inner radial positions (higher spatial frequencies) is attenuated relative to the signal corresponding to playback of information recorded at outer radial positions (lower spatial frequencies). The signal-to-noise ratio of the playback signal, therefore, decreases with decreasing radial position. A method around this problem is disclosed in U.S. Pat. No. 4,142,210 wherein information is recorded using a single mark size irrespective of the radial position of recording. This method, however, results in a significantly lower packing density of recorded information. An alternative method for compensating for the modulation transfer function of the playback optical system is disclosed in U.S. Pat. No. 4,118,734 which teaches the recording of information tracks which progressively increase in width with decreasing disk radius. This method also suffers from the disadvantage of significantly reducing the packing density of recorded information, as well as requiring mechanical apparatus for changing the size of the recording spot. It has also been proposed to correct for this source of distortion by decreasing the size of the playback spot at inner radial positions. See U.S. Pat. No. 4,157,568. As in the previous case, this method suffers from the disadvantage of requiring mechanical apparatus for changing spot size.

Insofar as the lengths of recorded information marks are concerned, it is also known that it is desirable to record information marks having an average information mark duty cycle of 50 percent. The information mark duty cycle is defined as the ratio of the mark length to the mark-to-mark center spacing. See, for example, "Intermodulation and Moire Effects In Optical Video Recording", by M. R. de Haan, Philips Res. Repts., Vol. 32, pp. 436–59, 1977. In particular, recording information at an average duty cycle of 50 percent minimizes and even eliminates second harmonic distortion. In terms of the recorded information marks (i.e., bumps, pits, craters, density images, etc.), an average duty cycle of 50 percent means that the average length of recorded information marks equals the average length of the spaces between such marks.

SUMMARY OF THE INVENTION

It is apparent from the above discussion that much attention has been devoted to the in-track length dimension of recorded information marks, both as regards the duty cycle of the recorded information as well as the scaling of spatial frequencies which occurs in radial format recording. In contrast to the focus of the prior art, the present invention is based on the discovery that the cross-track width—as opposed to the in-track length—of recorded information marks is an important parameter in certain types of optical disk recording. Specifically, it has been found that when recording large fractional bandwidth information on an optical disk, it is desirable to record information along tracks that have a substantially constant width. While the recording of constant width tracks is not a straightforward matter, as will be seen from the discussion which follows, the present invention provides a technique for producing constant width tracks. Specifically, the recording parameters are selected such that the maximum energy density received by the optical disk during exposure of information marks is approximately the same for all marks.

BRIEF DESCRIPTION OF THE DRAWINGS

In the detailed description of the preferred embodiments of the invention presented below, reference is made to the accompanying drawings, in which:

FIG. 9 is a block schematic diagram of an optical disk recording system that incorporates certain principles of the present invention.

DETAILED DESCRIPTION OF THE PREFERRED EMBODIMENTS

Figure 1:
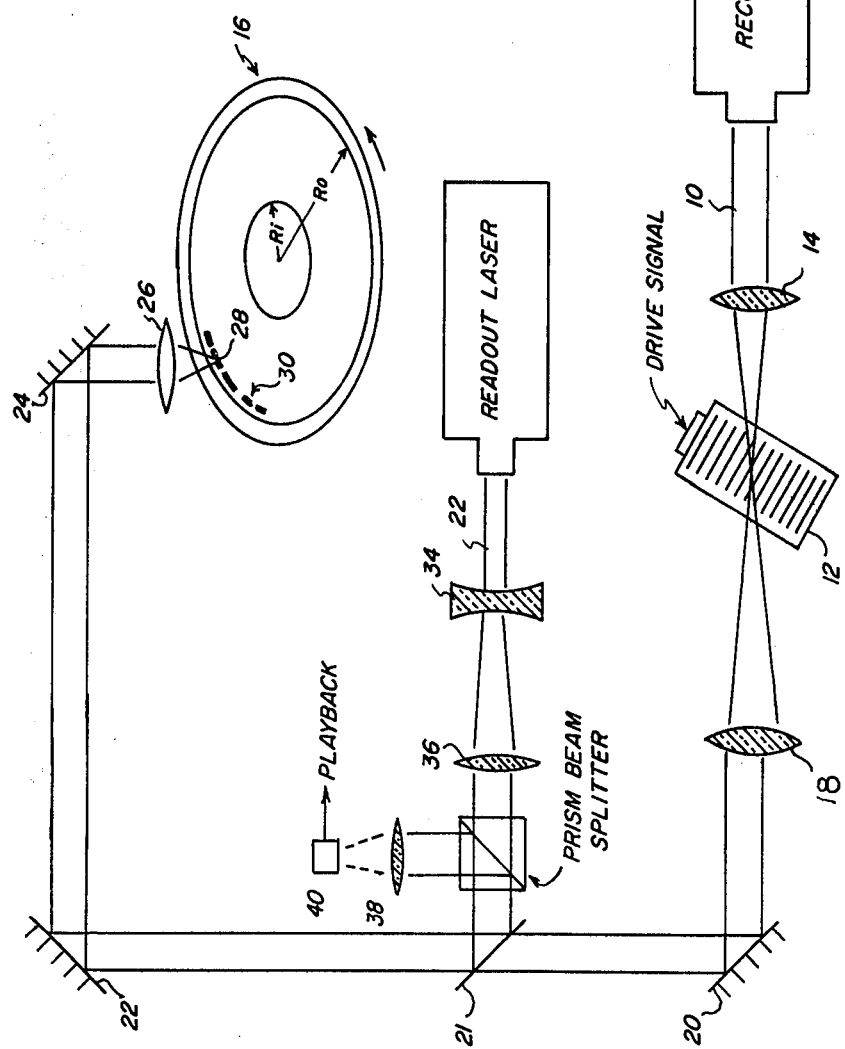
FIG. 1 is a schematic representation of apparatus used for recording information on an optical disk and for playing back information therefrom.

FIG. 1 shows apparatus for recording information on an optical disk 16 and for playing back information therefrom. A laser beam 10 from a recording laser is imaged onto an acousto-optic cell 12 by a lens 14. In response to a drive signal, the acousto-optic cell 12 modulates the intensity of the incident laser beam in accordance with information to be recorded on the optical disk 16. The modulated laser beam is collimated by a lens 18 and is directed by means of mirror elements 20, 22 and 24 to a high numerical aperture lens 26 which focuses the modulated laser beam to a recording spot 28 on the optical disk 16.

During recording, the optical disk 16 is spun at a constant rate, e.g., 1800 rotations per minute (rpm). As a result, a track of information marks 30 is recorded on the optical disk 16. As recording continues, the recording spot 28 is caused (by means not shown) to scan radially inward across the optical disk 16, thereby causing information marks to be recorded along a spiral track that extends from an outer radius $R_o$ to an inner radius $R_i$. The sizes and spacings of the recorded information marks vary in accordance with the information content of the acousto-optic cell drive signal, as well as with radial position on the optical disk 16. For example, assume that the drive signal varies in frequency between 8 MHz and 16 MHz, and that the outer radius $R_o$ is twice the inner radius $R_i$. Further assume that the duty cycle of recorded information marks remains constant irrespective of radial position on the optical disk. At the inner radius $R_i$, therefore, recorded information marks will vary in length from a length l (which results from the recording of a 16 MHz signal component) to a length 2l (which results from the recording of an 8 MHz frequency component). At the outer radius $R_o$, recorded information marks vary in length between a length 2l (16 MHz frequency component) to a length 4l (8 MHz frequency component). Over the entire optical disk 16, therefore, recorded information marks vary in length between a length l (16 MHz; $R_i$) to a length 4l (8 MHz; $R_o$).

The above example illustrates the concept of fractional bandwidth. In the case of an optical disk recording, there are two fractional bandwidths which are of concern. The drive signal has an electrical fractional bandwidth (EFBW) which is defined as the ratio of the maximum frequency component $f_{max}$ to the minimum frequency component $f_{min}$, i.e. $f_{max}/f_{min}$. The second fractional bandwidth arises from the fact that information is recorded on the optical disk in accordance with a radial format, which gives rise to a radial fractional bandwidth (RFBW) defined as the ratio of the outer radius of recording $R_o$ to the inner radius of recording $R_i$, i.e. $R_o/R_i$. The total fractional bandwidth (FBW) is the product of the electrical fractional bandwidth with the radial fractional bandwidth, i.e., $$FBW = (EFBW)(RFBW) = \left(\frac{f_{max}}{f_{min}}\right)\left(\frac{R_o}{R_i}\right)$$

In the example given above, the electrical fractional bandwidth is 2 and the radial fractional bandwidth is 2. The total fractional bandwidth of the information record on the optical disk is thus 4. In terms of the recorded information marks, the total fractional bandwidth corresponds to the ratio of the maximum recorded mark length to the minimum recorded mark length. Before discussing the importance of fractional bandwidth to the present invention, it is helpful to consider the process of playing back information from the optical disk 16.

During the playback process, the optical disk 16 is spun at the same rate as it was spun during the recording process. A laser beam 32 having a wavelength of 633 nanometers (nm) from a readout laser is expanded in diameter by means of lenses 34 and 36. The optical path of the readout laser beam is folded by a beam splitter 21 and mirrors 22, 24 so that the readout laser beam is focused to a playback spot on the optical disk 16 by the high numerical aperture lens 26. The optical disk 16 is assumed to be of the reflective type so that the radiation forming the playback spot is reflected back through the high numerical aperture lens 26 after interacting with the information marks recorded on the optical disk 16. (In the case of a transmissive optical disk, the playback optical system would be arranged so that the playback spot would pass through the optical disk in order to interact with recorded information marks.) A lens 38 directs reflected laser radiation which has been diverted by the prism beamsplitter onto a detector 40 which produces an electrical playback signal in response to temporal variations in the irradiance of the reflected laser radiation falling on the detector.

In most practical optical disk systems one desires to maximize the information content of the disk. Thus, the disks are recorded in such a way that the shortest length marks contained in the radial format recording are just resolved well enough during playback that they can be read with an adequate signal-to-noise ratio (SNR). The length l of such marks will generally be on the order of the full width at half maximum (FWHM) irradiance diameter of the focused recording spot. In general, if the total fractional bandwidth of the radial format recording (hereinafter referred to as the fractional bandwidth) is greater than 3, it has been found that the width (in the radial, or cross-track, direction) of recorded marks will vary as a function of disk radius, even if recording power is decreased with decreasing recording radius as is generally done. Moreover, if the fractional bandwidth is larger than 3, the width of marks recorded on a single track (turn of the disk) located in the vicinity of radius $R_i$ may vary significantly. Such track width variations produce a type of distortion in the playback signal that is difficult, if not impossible, to compensate for by electrical techniques such as pre-emphasis or equalization. To further complicate the matter, the exact nature of the distortions caused by recorded track (mark) width variations will depend upon the nature of the recorded marks, i.e., whether they modulate the amplitude (density marks) or phase (pits, bumps, bubbles) of the focused readout light.

Figure 2:
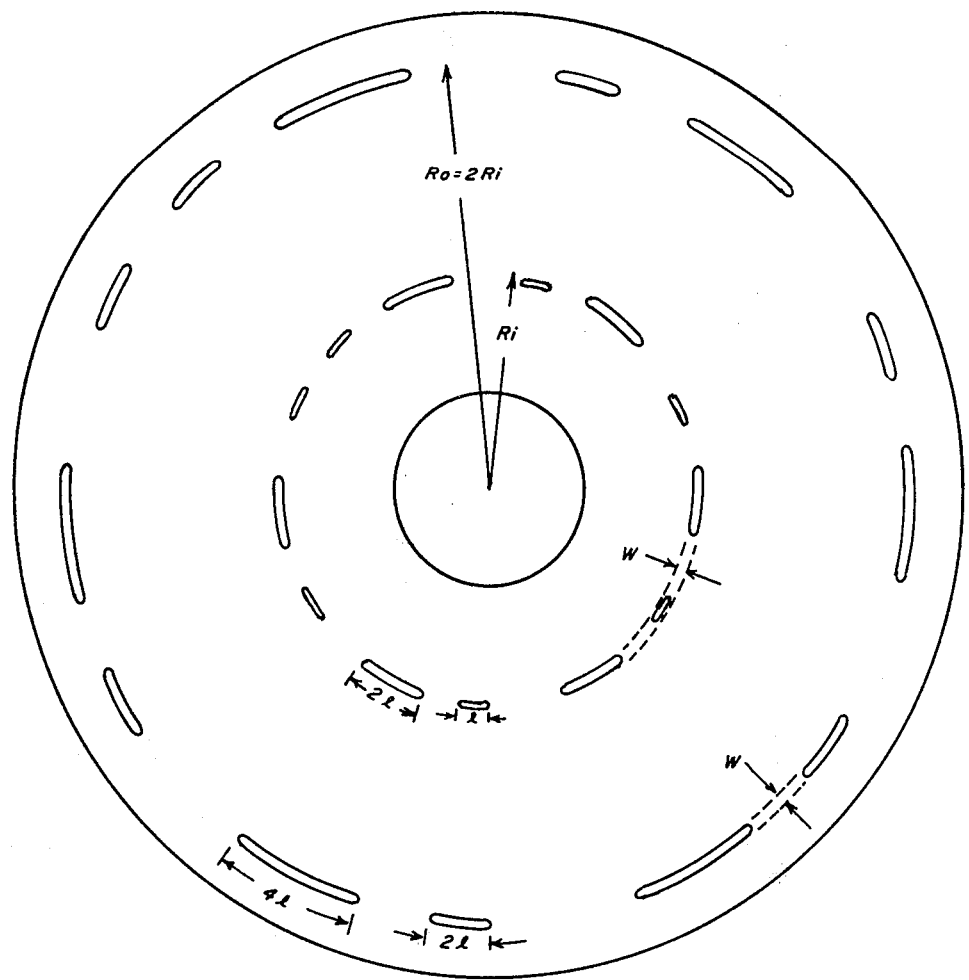
FIG. 2 is a qualitative illustration of the variation of track width which results from recording information on an optical disk absent the invention.

FIG. 2 qualitatively illustrates the problem for an optical disk recording that has a fractional bandwidth of 4 and for which the recording power was decreased linearly with decreasing disk radius, as is usually done to compensate for the decrease in tangential velocity of the optical disk when spun at a constant rate during recording. At the outer radial position $R_o$, the recorded information marks have a width W and have a length of either 2l or 4l. Recording the same information at the inner radial position $R_i$, however results in a distortion of the higher frequency information. Specifically, the smaller recorded information marks (length 2l at $R_o$) should have a length of l and a width of W. As illustrated in FIG. 2, however, the actual width of these information marks is significantly less than W. In other words, at inner radial positions information marks corresponding to high frequency components of a relatively large fractional bandwidth recording (i.e., a fractional bandwidth greater than about 3) are smaller than they should be in the width-wise direction.

Figure 3:
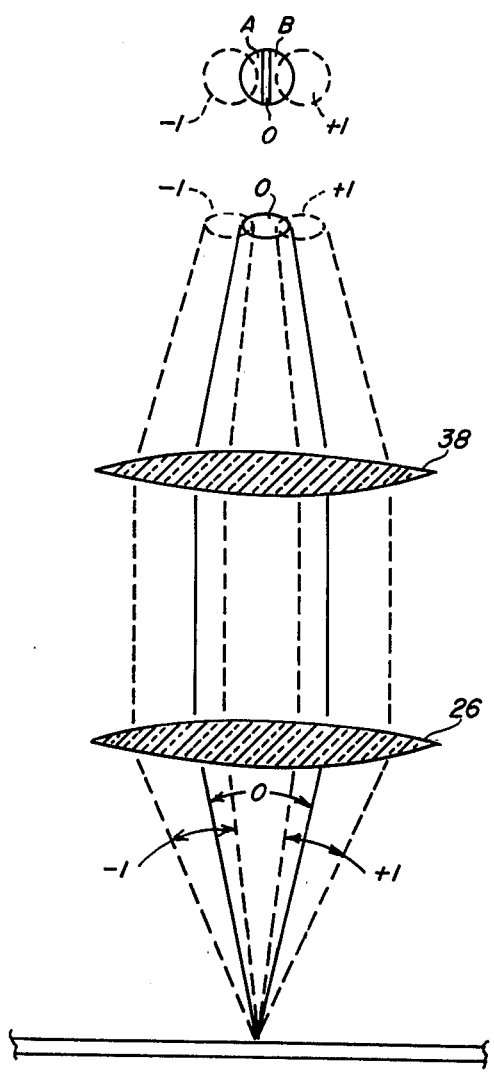
FIG. 3 is a diagram illustrating two types of detection used for playing back information recorded on an optical disk.
Figure 4:
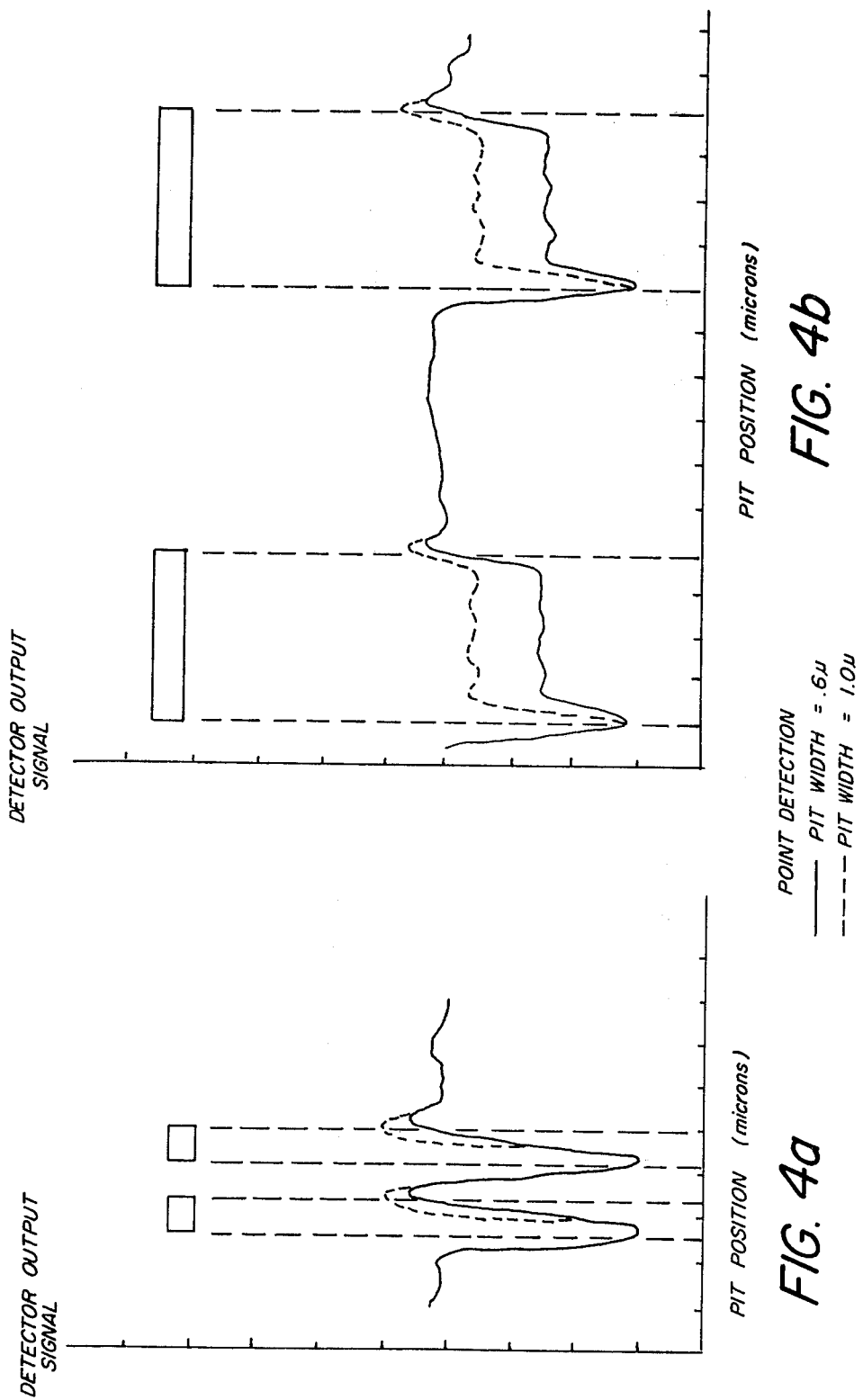
FIGS. 4a, 4b, 5a and 5b are plots of computer generated data showing the effect of track width on the playback signal.

The particular effect of track width variations on the detector output signal in a large fractional bandwidth system also depends on the type of detection process used in the playback system. Two common detection processes are point detection and central aperture detection. FIG. 3 illustrates these detection methods. The interaction of the playback spot with the recorded information marks produces a diffraction pattern containing a zero order diffracted beam and several higher order diffracted beams which represent the spatial frequencies contained in the distribution of in-track recorded mark lengths. The limiting aperture of the playback optical system is such that at least the zero order beam (denoted "0") and the plus and minus first order beams (denoted "+1" and "−1", respectively) fall in the plane of the detector. (Vignetted portions of higher order beams may also fall on the detector but, for purposes of simplicity, are not shown in FIG. 3.) The detection system shown in FIG. 3 is comprised of two detectors, labeled A and B, which are sized, shaped and disposed to be just filled by the zero order beam. The boundary between A and B is oriented such that it is perpendicular to the direction in which the orders are diffracted. During the playback process, the degree of overlap of the plus and minus first order beams with the zero order beam varies in accordance with the spatial frequency of the information marks which are being read out. The phases of the plus and minus first order beams relative to the zero order beam phase vary as the playback spot scans across the recorded information marks, thereby giving rise to varying amounts of constructive and/or destructive interference between the zero order beam and the first order beams in the region in which they overlap. The detectors A and B convert these temporal optical irradiance variations to electrical signals which vary in amplitude in a manner that ideally corresponds to the passage of the recorded information marks beneath the focused read spot. In point detection, an output signal is produced from either detector A or detector B. (This can be done by leaving one detector unconnected, by masking one of the detectors, or by placing a stop that vignetts only either the positive or negative orders between lenses 26 and 38 in FIG. 3.) In central aperture detection, the electrical signals from both detectors A and B are added to produce the output signal.

FIGS. 4a, 4b, 5a and 5b are plots illustrating the effects of track width variation on the playback signal recovered from a disk having marks which consist of pits or depressions that weakly effect the amplitude and strongly effect the phase of focused readout light interacting with them. These plots were computed via a mathematical model of the playback process. The mathematical model assumes that scalar diffraction theory adequately describes the playback process. These Figures represent the playback of recorded information marks that are rectangularly shaped depressions described by a complex reflection $r_c = re^{i\theta}$, where $r_c = 0.949$ in the spaces between depressions and $r_c = 0.894i$ in the depressions. (Such marks are thus approximately $\pi/2$ phase shift pits.) The playback spot used is that formed by a diffraction limited, perfectly focused optical system having a square entrance pupil of $0.6 \times 0.6$ numerical aperture.

FIGS. 4a and 4b illustrate the effects of track width variations when a point detection playback system is used during playback of the above-described disk. FIG. 4a shows the case for two marks which are 0.8 microns in length and which have a center-to-center spacing of 1.6 microns. The solid line shows the detector output signal assuming a track width of 0.6 microns; the broken line shows the same case where the track width is now assumed to be 1.0 microns. FIG. 4b shows the same information for marks which are 4.0 microns in length and have a center-to-center spacing of 10.0 microns. In either case, the peak-to-peak signal level as well as the waveform of the detector output signal are dependent on the track width. In the case of the lower spatial frequency (FIG. 4b), the waveform is strongly dependent on track width. As a result, a detection system which is set up to provide proper playback of information tracks which are 0.6 microns in width will produce a distorted output signal upon playback of information tracks which are of a different width, such as 1.0 microns, especially for large fractional bandwidth recordings containing both high and low frequency information.

Figure 5:
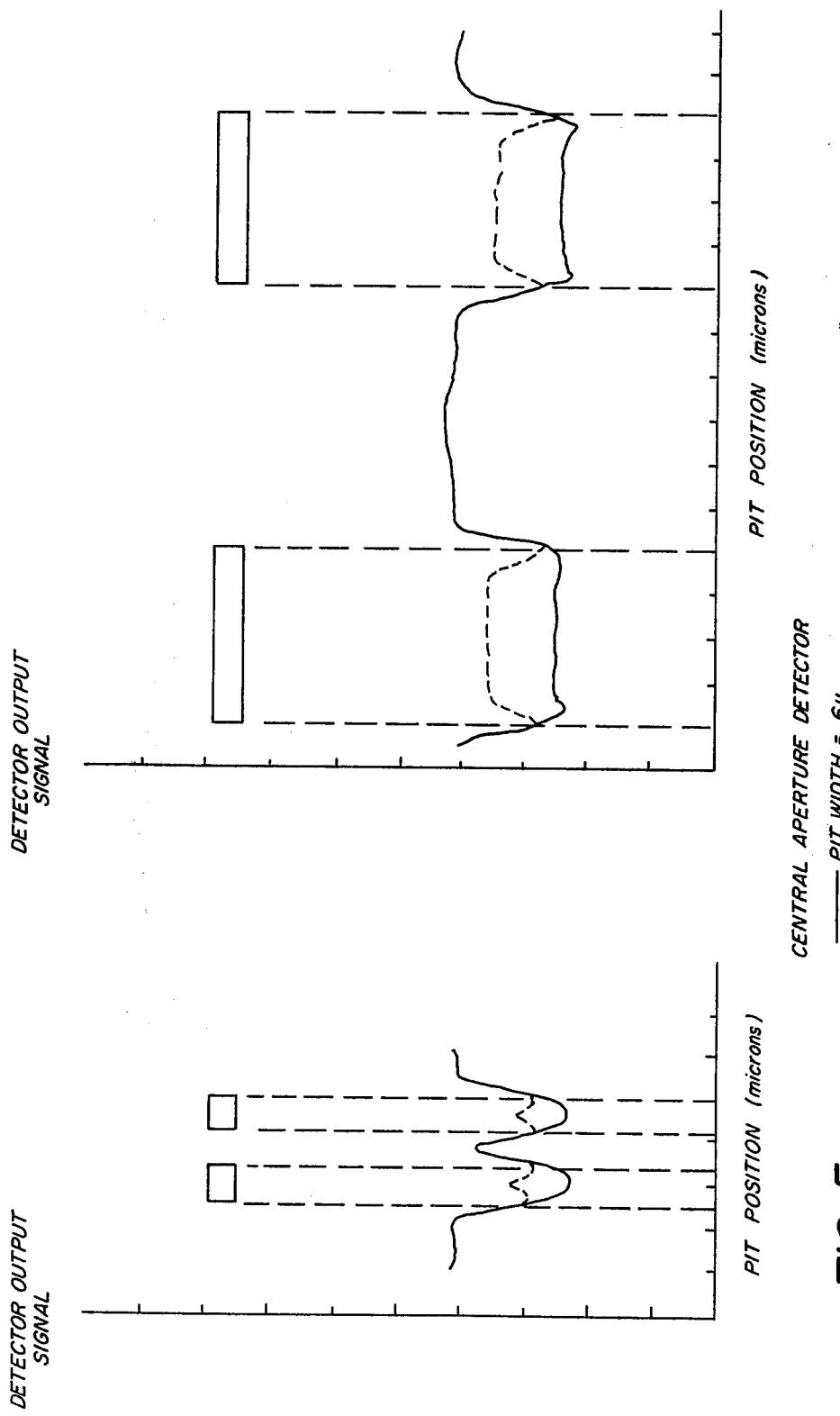

A similar result occurs in the case of a central aperture detection system. FIGS. 5a and 5b are computer generated plots based on the above-discussed mathematical model for the same cases as plotted in FIGS. 4a and 4b, respectively, except that central aperture detection has been assumed instead of point detection. Inspection of FIGS. 5a and 5b shows that both the peak-to-peak signal level and the waveform of the detector output signal is again a function of track width. In this case, it is interesting to note that "frequency doubling" occurs in the sense that a single peak in the detector output signal changes to a pair of peaks as the track width changes from 0.6 microns to 1.0 microns.

In accordance with the present invention, large fractional bandwidth information is recorded on an optical disk along tracks of information marks which have a substantially constant width. To achieve this result, the present invention recognizes that, because there is no scanning of the recording spot in the cross-track direction, the width of the recorded information marks is controlled by the energy density deposited along the center of the area of optical disk scanned during the recording of a mark. Specifically, the maximum track width of a recorded information mark is determined by the maximum energy density received by the optical disk during recording. The present invention, therefore, achieves constant track width recording by controlling the various parameters of the recording process (specifically, the size of the recording spot, the velocity of relative movement between the optical disk and recording spot, and the modulation of the recording spot) so that each recorded information mark receives substantially the same maximum energy density during recording. In accordance with the invention, the recording parameters may be selected so as to be fixed during the recording process, or one or more of the recording parameters vary as a function of the radial position of recording. To illustrate the concepts of the present invention, it is helpful to consider a specific example wherein the recording spot has a gaussian irradiance profile given by $$I = I_o e^{-x^2/2\sigma^2}, \qquad (1)$$

where $I_o$ denotes the central focused record spot irradiance, x denotes the distance from the center of the focused spot, and $\sigma$ is a constant which determines the lateral spread of the spot profile. During the recording process, the recording spot is modulated, i.e., turned "on" and "off", as it is scanned tangentially (i.e., along the recorded track) across the spinning optical disk. The energy density W received by the scanned optical disk is given by $$W(x) = \int_0^T I_o e^{\frac{-(x-vt)^2}{2\sigma^2}} dt, \qquad (2)$$

where T denotes the "on" time of the recording spot and v denotes the tangential velocity of the disk at the radial position of recording. (Because the disk spins at a constant rate during the recording process, the tangential velocity v is directly proportional to the disk radius.) The maximum energy density $W_m$ received by the recording material for each recorded information mark can be shown to occur at its geometrical center, given by x=vT/2. (This assumes an infinitely fast modulator rise and fall time. For finite rise and fall times, the maximum energy density deposit is displaced toward the trailing edge of the mark.) Accordingly, $$W_m = \int_0^T I_o e^{\frac{-(\frac{vT}{2} - vt)^2}{2\sigma^2}} dt. \qquad (3)$$

This equation can be rewritten in terms of the dimensionless parameters $$E = \frac{W_m v}{I_o \sigma} \text{ and } \alpha = \frac{vT}{2\sigma} \text{ as } E = \int_0^{2\alpha} e^{-1/2(\alpha - t')^2} dt', \qquad (4)$$

where t' is a variable of integration. The recording parameters which affect E and $\alpha$ are the tangential velocity v, the laser on time T, and the lateral spread constant $\sigma$. (It should be noted that the central beam irradiance $I_o$ does not affect E because the quantity ($W_m/I_o$) is, by virtue of equation 3, independent of $I_o$.)

Figure 6:
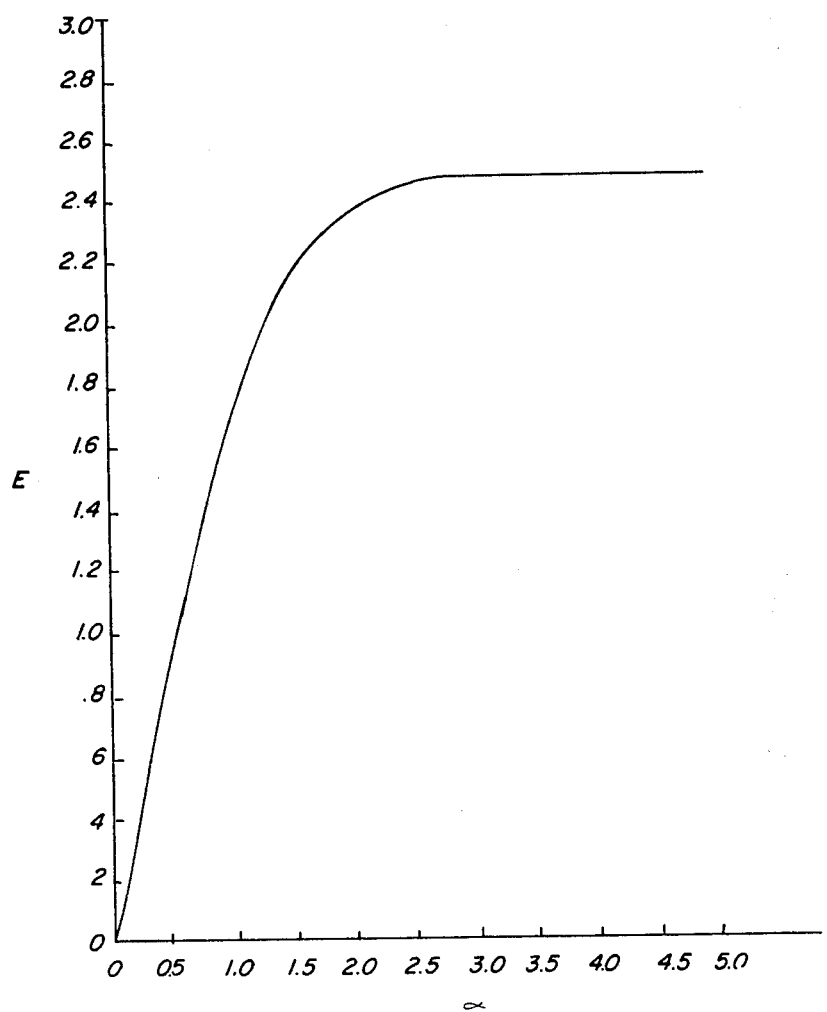
FIGS. 6 and 7 are plots useful in explaining the concepts of the present invention.

FIG. 6 is a plot of the functional relationship between the dimensionless parameters E and $\alpha$ as defined by equation 4. (E is plotted along the ordinate and $\alpha$ is plotted along the abscissa.) As seen from FIG. 4, the parameter E is substantially constant for values of $\alpha$ greater than about 1.5. This is important because the parameter E is representative of the maximum energy density $W_m$ received by the optical disk during recording of information marks and the parameter $\alpha$ is representative of the radial position (via the tangential velocity v) and the information frequency (via the laser on time T) of recorded information marks. Accordingly, so long as E is substantially constant (i.e., $\alpha$ greater than about 1.5), recorded information marks will receive the same maximum energy density during recording, irrespective of information frequency or radial position on the optical disk. In accordance with the present invention, therefore, various recording parameters (v, T and $\sigma$) are selected so that the dimensionless parameter E is substantially constant, which is equivalent to requiring $\alpha$ to be greater than about 1.5. Accordingly, the minimum recording spot on time which will satisfy the criterion of the invention ($\alpha$ greater than 1.5) is given by $$T_{min} = \frac{2\sigma}{v} (1.5). \qquad (5)$$

This value of $T_{min}$ sets a limit on the shortest pulse duration (mark length) that can be recorded in accordance with the present invention. It should be noted that the value of $T_{min}$ depends on the radial position of recording through the disk tangential velocity v, and upon the size of the recording spot through the parameter $\sigma$.

Figure 7:
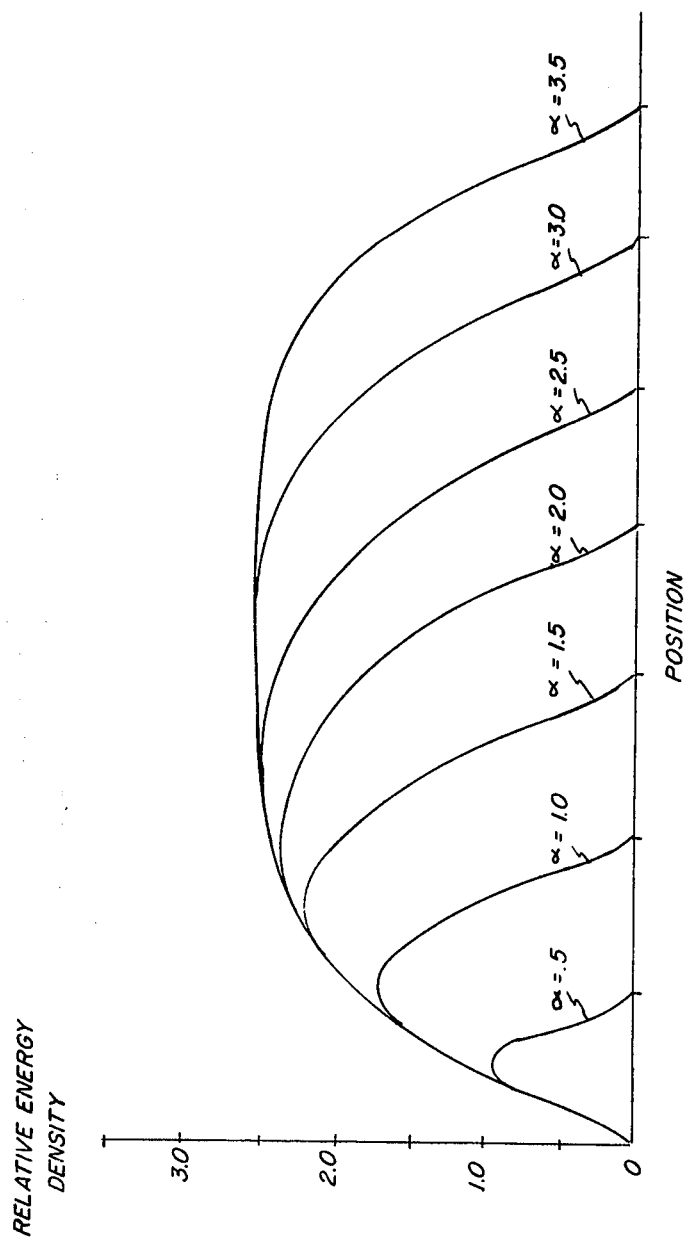

The information contained in the E vs $\alpha$ curve of FIG. 6 can be presented in terms of the energy density as seen by the recording material. FIG. 7 shows plots of the energy density received by the recording material in the in-track direction for various values of $\alpha$. (The plots are derived from equation 2.) It is seen from FIG. 7 that for marks recorded with $\alpha$ values in excess of about 1.5, the maximum energy density received at an information mark is about the same. It is also seen that the maximum energy density is received at the geometrical center of the mark, as discussed above (assuming negligible modulated beam rise and fall times).

Figure 8:
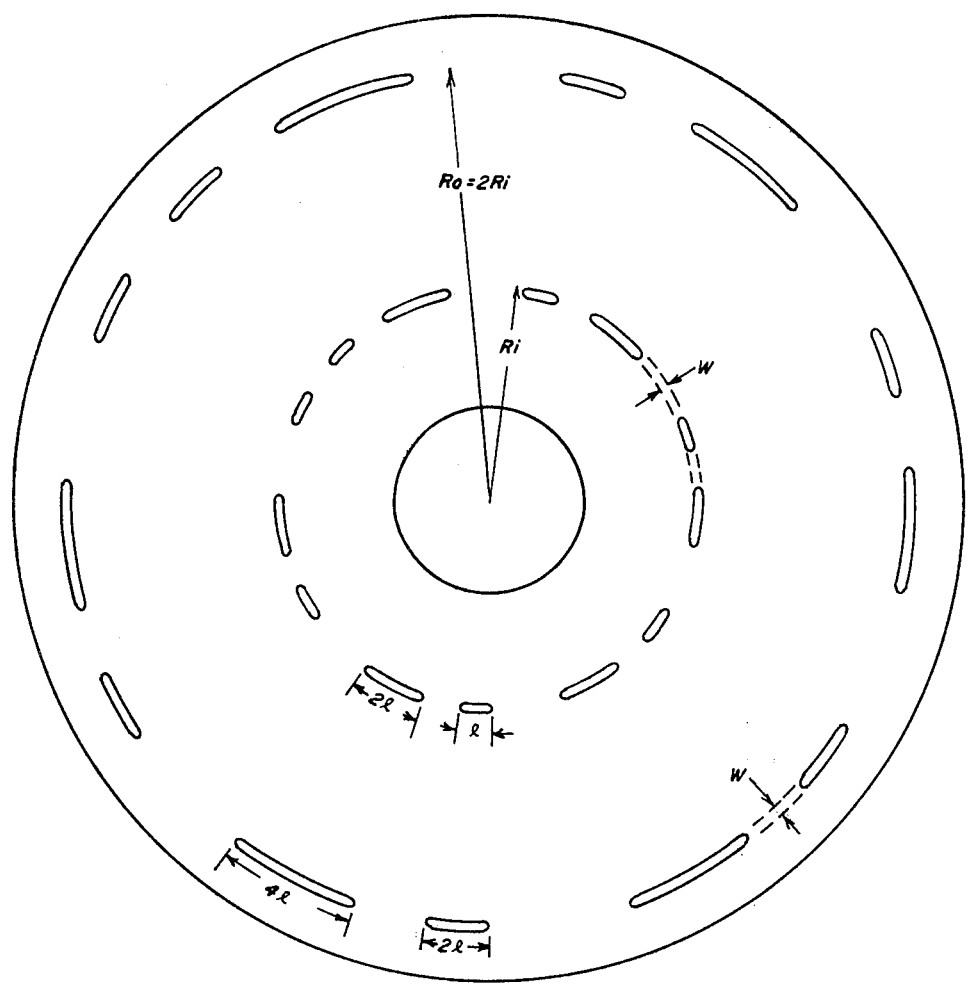
FIG. 8 is a qualitative illustration of an optical disk recording made by practicing the invention.

In general, irrespective of the irradiance profile of the recording spot, the present invention provides for the control of the recording parameters, i.e., the tangential disk velocity, the size of the recording spot and the modulation of the recording spot, such that all recorded information marks receive approximately the same maximum energy density. Controlling the modulation of the recording spot includes the control of the duty cycle of the modulated recording spot and/or the frequency of modulation. Usually, as discussed above, the maximum energy density will be received at the geometrical center of the recorded mark. FIG. 8 shows qualitatively a recording produced by practicing the present invention, and should be compared to FIG. 2 which shows the same information recorded absent the invention. It is seen that the width of recorded information tracks is substantially constant.

The basic concepts of the present invention discussed above are illustrated in the optical disk recording system shown in FIG. 9. The optical disk 16' includes a threshold recording material comprised of an amorphous composition of a dye and a binder having an absorption factor greater than 20. The absorption factor is defined as the product of the weight percent of dye included in the dye-binder composition with the molar extinction coefficient of the dye at the wavelength of the recording laser beam, divided by the molecular weight of the dye. The absorption factor is thus recited in terms of liter per gram-centimeter. This recording material is disclosed in more detail in U.S. patent application Ser. No. 184,554, filed Sept. 5, 1980 in the names of H. T. Thomas and J. J. Wrobel which is a continuation of U.S. patent application Ser. No. 23,434 (now abandoned), and which is hereby incorporated by reference. Other examples of thresholding recording materials include dye-bleach systems, photochromic systems, and ablative metal films.

A signal source 50 provides an analog information signal varying in frequency between 8 MHz and 12 MHz. Such a signal thus has a fractional bandwidth of 1.5. A thresholding circuit 52 converts the analog information signal to a series of "on-off" pulses by conventional thresholding techniques. For reasons which are discussed below, the threshold level is adjustable to allow the duty cycle of the resultant pulse train to be varied in response to a control signal from a radial position feedback circuit 54. A modulator 56 turns a laser beam 58 from a recording laser 60 on and off in accordance with the pulse train from the thresholding circuit 52. The modulated laser beam is then focused to a recording spot 61 on the recording material of the optical disk 16' by a 0.65 numerical aperture lens system 62.

The lens system 62 includes means for causing the recording spot to scan radially inward across the optical disk 16' from an outer radius of 120 mm to an inner radius of 60 mm. The radial fractional bandwidth is thus 2.0, resulting in a total fractional bandwidth of 3.0 (1.5 times 2.0). The radial scanning of the recording spot 61 is monitored by the radial position feedback circuit 54.

As discussed above, the minimum laser on time is given by equation 5 as $$T_{min} = \frac{2\sigma}{v} (1.5).$$

Assuming the optical disk spins at a rate of 1800 rpm, the tangential velocity v at the outer radius (120 mm) is 22.6 meters per second. The minimum laser on time $T_{min}$ at the outer radius is, therefore, 28.2 nanoseconds (assuming $\sigma$ equals 0.2121 microns, which is the measured $\sigma$ value of a 0.65 numerical aperture optical system having aberrations). In the case of a 12 MHz frequency signal and a 50 percent duty cycle, the laser on time is 41.7 nanoseconds, which is above $T_{min}$ (28.2 nanoseconds), so no violation of equation 5 occurs. At a radial position of 80 mm, however, the minimum laser on time $T_{min}$ in accordance with the invention is 42.3 nanoseconds, which is greater than the 41.7 nanosecond laser on time corresponding to 12 MHz. Equation 5 is thus violated. In accordance with the present invention, the laser on time is maintained above $T_{min}$ by increasing the duty cycle of the modulated recording beam, via the adjustable thresholding circuit 52, to increase the laser on time at the highest recorded frequency (12 MHz) to $T_{min}$ (or above). (The duty cycle of the modulated recording beam is defined as the percentage of laser on time.) The duty cycle of the modulated recording beam continues to be increased as the radial position of recording decreases, thereby maintaining the laser on time at all frequencies equal to or greater than $T_{min}$. By changing the duty cycle of the modulated recording beam as a function of radial position of recording, therefore, the laser on time is not allowed to fall below $T_{min}$. Progressively increasing the duty cycle with decreasing radial position would result in information marks being recorded which are too long. To prevent this, the present invention provides for the decreasing of laser power with decreasing disk radius in such a manner as to produce recorded information marks of the proper length. Additionally, the range of recording powers used over the total recording annulus of the disk (radii $R_o$ to $R_i$) is chosen so that recorded track widths are constant over the entire disk.

Alternatively, the invention prescribes choosing a recording frequency range or $\sigma$ value so that the condition that $\alpha$ be greater than about 1.5 is not violated. Thus, in the present example, either a maximum frequency of less than 12 MHz should be used, or a recording optical system having a higher numerical aperture (i.e., smaller $\sigma$ value) should be used, or a combination of both.

The invention has been described in detail with particular reference to preferred embodiments thereof, but it will be understood that variations and modifications can be effected within the spirit and scope of the invention.

What is claimed is:

1. A method for forming, on an optical disk, an information record that has a total fractional bandwidth greater than about 3 and a substantially constant track width, said method comprising the steps of:
   (a) focusing a recording beam on the optical disk;
   (b) providing relative movement between the optical disk and the recording beam focused thereon;
   (c) modulating the recording beam to expose information marks of different lengths on the optical disk; and
   (d) controlling (i) the size of the focused recording beam, (ii) the velocity of relative movement between the optical disk and the recording beam, and (iii) the modulation of the recording beam so that the maximum energy density received by the optical disk during exposure of the marks of information is approximately the same for all marks.

2. A method as claimed in claim 1 wherein relative movement between the optical disk and the recording beam focused thereon is provided by spinning the optical disk while moving the focused recording beam radially across the optical disk, thereby causing marks of information to be recorded along a spiral track extending between an outer radius $R_o$ and an inner radius $R_i$ on the optical disk.

3. A method as claimed in claim 2 wherein the duty cycle of the modulated recording beam is controlled as a function of the radial position of recording to maintain the maximum energy density received by the optical disk during exposure of each information mark approximately constant.

4. A method as claimed in claim 3 further comprising the step of controlling the irradiance of the modulated recording beam to control the length of recorded information marks.

5. A method as claimed in claim 2 wherein the radial fractional bandwidth defined by $R_o/R_i$ is equal to or greater than about 2.

6. A method for forming, on an optical disk, an information record that has a total fractional bandwidth greater than about 3 and a substantially constant track width, said method comprising the steps of:
   (a) focusing a recording beam on the optical disk;
   (b) providing relative movement between the optical disk and the recording beam focused thereon;
   (c) modulating the recording beam to expose information marks of different lengths on the optical disk; and
   (d) controlling (i) the size of the focused recording beam, (ii) the velocity of relative movement between the optical disk and the recording beam, and (iii) the modulation of the recording beam so that the energy density received during recording by the optical disk at the approximate geometrical center of each information mark is substantially constant.

7. A method as claimed in claim 6 wherein relative movement between the optical disk and the recording beam focused thereon is provided by spinning the optical disk while moving the focused recording beam radially across the optical disk, thereby causing marks of information to be recorded along a spiral track extending between an outer radius $R_o$ and an inner radius $R_i$ on the optical disk.

8. A method as claimed in claim 7 wherein the radial fractional bandwidth defined by $R_o/R_i$ is equal to or greater than about 2.

9. A method for forming, on an optical disk, an information record that has a total fractional bandwidth greater than about 3 and a substantially constant track width, said method comprising the steps of:
   (a) focusing a beam of radiation to a recording spot on the optical disk;
   (b) spinning the optical disk;
   (c) radially scanning the recording spot across the optical disk between an outer radial position $R_o$ and an inner radial position $R_i$;
   (d) modulating the recording spot in accordance with the information to be recorded to expose information marks of different lengths; and
   (e) controlling (i) the size of the focused recording spot, (ii) the velocity of relative movement between the optical disk and the recording spot, and (iii) the modulation of the recording spot so that the maximum energy density received by the optical disk during recording of information corresponding to the upper frequency limit $F_{max}$ is substantially equal, at all radial positions between $R_o$ and $R_i$, to that received by the optical disk during recording of information corresponding to the lower frequency limit $F_{min}$.

10. A method as claimed in claim 9 wherein the duty cycle of the modulated recording spot is controlled as a function of radial position of recording to maintain the maximum energy density received by the optical disk during exposure of each information mark approximately constant.

11. A method as claimed in claim 10 further comprising the step of controlling the irradiance of the modulated recording spot as a function of radial position of recording to control the length of recorded information marks.

12. Apparatus for forming, on an optical disk, an information record that has a total fractional bandwidth greater than about 3 and a substantially constant track width, said apparatus comprising:
   (a) means for focusing a recording beam on the optical disk;
   (b) means for providing relative movement between the optical disk and the recording beam focused thereon;
   (c) means for modulating the recording beam to expose information marks of different lengths on the optical disk; and
   (d) means for controlling (i) the size of the focused recording beam, (ii), the velocity of relative movement between the optical disk and the recording beam, and (iii) the modulation of the recording beam so that the maximum energy density received by the optical disk during exposure of the marks of information is approximately the same for all marks.

13. Apparatus as claimed in claim 12 wherein said movement means includes means for spinning the optical disk while moving the focused recording beam radially across the optical disk, thereby causing marks of information to be recorded along a spiral track extending between an outer radius $R_o$ and an inner radius $R_i$ on the optical disk.

14. Apparatus as claimed in claim 13 wherein said control means includes means for controlling the duty cycle of the modulated recording beam as a function of the radial position of recording to maintain the maximum energy density received by the optical disk during exposure of each information mark approximately constant.

15. Apparatus as claimed in claim 14 further comprising means for controlling the irradiance of the modulated recording beam as a function of the radial position of recording to control the length of recorded information marks.

16. Apparatus as claimed in claim 13 wherein the radial fractional bandwidth defined by $R_o/R_i$ is equal to or greater than about 2.

17. Apparatus for forming, on an optical disk, an information record that has a total fractional bandwidth greater than about 3 and a substantially constant track width, said apparatus comprising:
   (a) means for focusing a recording beam on the optical disk;
   (b) means for providing relative movement between the optical disk and the recording beam focused thereon;
   (c) means for modulating the recording beam to expose information marks of different lengths on the optical disk; and
   (d) means for controlling (i) the size of the focused recording beam, (ii) the velocity of relative movement between the optical disk and the recording beam, and (iii) the modulation of the recording beam so that the energy density received during recording by the optical disk at the approximate geometrical center of each information mark is substantially constant.

18. Apparatus as claimed in claim 17 wherein said movement means includes means for spinning the optical disk while moving the focused recording beam radially across the optical disk, thereby causing marks of information to be recorded along a spiral track extending between an outer radius $R_o$ and an inner radius $R_i$ on the optical disk.

19. Apparatus as claimed in claim 18 wherein the radial fractional bandwidth defined by $R_o/R_i$ is equal to or greater than about 2.

20. Apparatus for forming, on an optical disk, an information record that has a total fractional bandwidth greater than about 3 and a substantially constant track width, said apparatus comprising:
    (a) means for focusing a beam of radiation to a recording spot on the optical disk;
    (b) means for spinning the optical disk;
    (c) means for radially scanning the recording spot across the optical disk between an outer radial position $R_o$ and an inner radial position $R_i$;
    (d) means for modulating the recording spot in accordance with the information to be recorded to expose information marks of different lengths; and
    (e) means for controlling (i) the size of the focused recording spot, (ii) the velocity of relative movement between the optical disk and the recording spot, and (iii) the modulation of the recording spot so that the maximum energy density received by the optical disk during recording of information corresponding to the upper frequency limit $F_{max}$ is substantially equal, at all radial positions between $R_o$ and $R_i$, to that received by the optical disk during recording of information corresponding to the lower frequency limit $F_{min}$.

21. Apparatus as claimed in claim 20 wherein said controlling means includes means for controlling the duty cycle of the modulated recording beam as a function of the radial position of recording to maintain the maximum energy density received by the optical disk during exposure of each information mark approximately constant.

22. Apparatus as claimed in claim 21 further comprising means for controlling the irradiance of the modulated recording beam as a function of the radial position of recording to control the length of recorded information marks.

* * * * *